(12) United States Patent
Shida et al.

(10) Patent No.: US 7,717,476 B2
(45) Date of Patent: May 18, 2010

(54) END STRUCTURE FOR AN AIR INTAKE PIPE

(75) Inventors: Kiyofumi Shida, Saitama (JP); Junji Saiga, Saitama (JP); Yasunobu Endo, Saitama (JP); Masakazu Kitamoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/943,076

(22) Filed: Sep. 15, 2004

(65) Prior Publication Data

US 2005/0057041 A1 Mar. 17, 2005

(30) Foreign Application Priority Data

Sep. 17, 2003 (JP) .............................. 2003-323857

(51) Int. Cl.
*F16L 41/00* (2006.01)
(52) U.S. Cl. ....................................... 285/203; 285/204
(58) Field of Classification Search ......... 285/202–204, 285/139.3, 140.1, 137.11, 921, 196, 194, 285/179; 52/199
See application file for complete search history.

(56) References Cited

U.S. PATENT DOCUMENTS

| 3,232,644 | A | * | 2/1966 | Pfeifer et al. | ............... 285/194 |
|---|---|---|---|---|---|
| 3,386,663 | A | * | 6/1968 | Mandy et al. | ............ 239/284.1 |
| 3,427,894 | A | * | 2/1969 | Tschanz | .................. 285/140.1 |
| 4,773,279 | A | * | 9/1988 | Spease et al. | ............... 74/502.4 |
| 5,163,619 | A | * | 11/1992 | Wada | ....................... 239/284.1 |
| 6,113,006 | A | * | 9/2000 | Walker et al. | ............ 239/284.1 |
| 6,260,771 | B1 | * | 7/2001 | Martin | .................... 239/284.1 |
| 6,305,618 | B1 | * | 10/2001 | Lin | ......................... 239/284.1 |
| 6,447,023 | B1 | * | 9/2002 | Grimm | ....................... 285/319 |

FOREIGN PATENT DOCUMENTS

| JP | 5-44459 | 2/1993 |
|---|---|---|
| JP | 5-223023 | 8/1993 |
| JP | 10-246158 | 9/1998 |
| JP | 2003-237663 | 8/2003 |

OTHER PUBLICATIONS

Japanese Office Action for Application No. 2003-323857, dated Oct. 17, 2008.

* cited by examiner

*Primary Examiner*—Aaron M Dunwoody
(74) *Attorney, Agent, or Firm*—Lahive & Cockfield, LLP; Anthony A. Laurentano, Esq.

(57) ABSTRACT

An end structure for a pipe is provided, through which air is drawn from a lower position to an upper position relative to a vertical direction of a vehicle. An area of an opening at an end of the pipe is adapted to be greater than a cross section area of the pipe.

9 Claims, 4 Drawing Sheets

END STRUCTURE FOR AN AIR INTAKE PIPE

BACKGROUND OF THE INVENTION

The present invention relates to an end structure for a pipe, which draws air from a lower position to an upper position relative to a vertical direction of a vehicle, such as a drain pipe for a canister.

A canister, which is located between a fuel tank and an engine, temporarily reserves evaporated fuel coming from the fuel tank and begins to supply the fuel to the engine after its start. Adsorbent such as activated carbon adsorbing the evaporated fuel is filled in the canister. Supply of the evaporated fuel to the engine is conducted by utilizing negative pressure produced by the engine in operation. It is carried out in such a manner that the canister draws air from the atmosphere through a drain pipe and desorbs the evaporated fuel so as to supply it to the engine.

An end plane of the drain pipe, which is an opening serving as an intake, is perpendicular to an axis of the drain pipe and located under a vehicle, normally under a floor panel, being directed downward. The drain pipe is once extended upward and routed so as to be connected to the canister. An example of conventional end structure for a drain pipe is disclosed in Japanese Published Patent Application H10-246158.

Normally, it is unlikely that drops of water intrude into the drain pipe because the opening is directed downward as described above. As the volume of a canister has been increased of late years aiming at an improvement in its performance, an amount of air for desorbing the evaporated fuel has been increasingly demanded. In this connection, it is likely that the drops of water, especially those which fall along the outer surface of the drain pipe and ought to drip from a periphery of the opening, are drawn into the drain pipe.

SUMMARY OF THE INVENTION

The present invention has been created to overcome a drawback described above. It seeks to provide an end structure capable of preventing water intrusion, which can be applied to a pipe that draws air from a lower position to an upper position relative to a vertical direction of a vehicle, such as a drain pipe for a canister.

It is an aspect of the present invention to provide an end structure for a pipe through which air is drawn from a lower position to an upper position relative to a vertical direction of a vehicle. An area of an opening at an end of the pipe is adapted to be greater than a cross section area of the pipe.

Because the end structure described above is able to restrain velocity of the air at the opening compared with that flowing inside the pipe as a result of an increase in the area of the opening, it is possible to prevent sucking drops of water dripping from the periphery of the opening.

It is another aspect of the present invention to provide an end structure for a pipe, in which the periphery of an end of the pipe is adapted to be diagonal relative to an axis of the pipe.

Because the end structure described above allows extension of the opening with a simple and compact end shape, it is possible to prevent interference with other devices and members even when they are located in the vicinity of the end structure.

It is still another aspect of the present invention to provide an end structure for a pipe, which further includes a flange. The flange is diagonally formed at an end of the pipe relative to an axis of the pipe so that the flange guides and collects drops of water which attach to an outer surface of the pipe.

The end structure described above allows the drops of water, which fall along the outer surface of the pipe, to travel on a slope of the flange to its lowest end. The drops of water collected there drip from the lowest end of the periphery of the pipe in a larger drop. In this way, it is possible to more efficiently prevent sucking the drops of water in collaboration with effect of a reduction in air velocity as a result of extension of area for the opening.

It is yet another aspect of the present invention to provide an end structure for a pipe which includes a drain pipe for a canister. The drain pipe allows the canister to be in communication with the atmosphere.

The end structure described above allows prevention of water intrusion into the drain pipe.

DESCRIPTION OF THE PREFERRED EMBODIMENTS

Embodiments of the present invention are now described with reference to the accompanying drawings.

Figure 1:
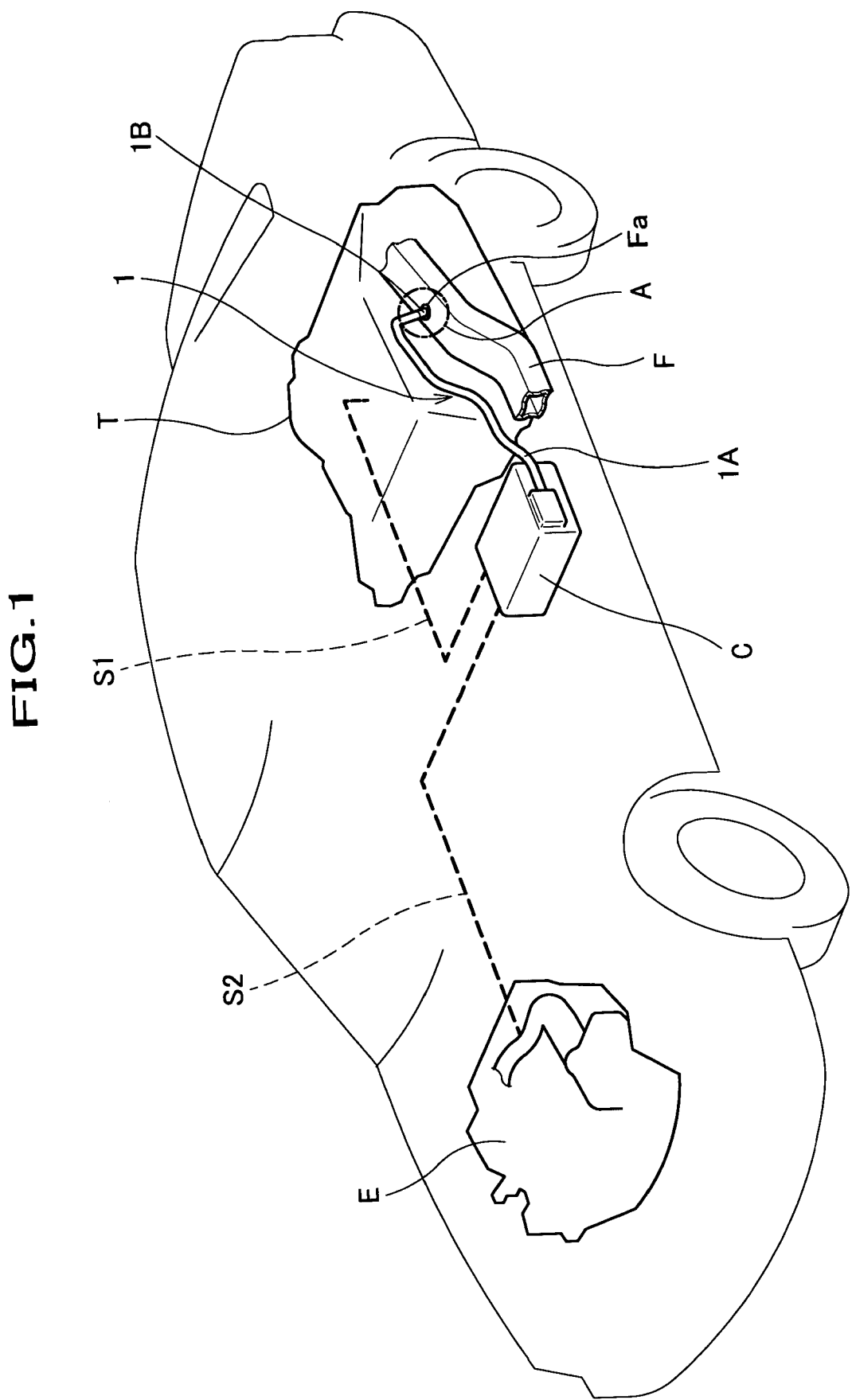
FIG. 1 is a perspective view illustrating routing of a drain pipe for a canister.

As shown in FIG. 1, a fuel tank T is disposed under a floor in a rear portion of a vehicle and a canister C is disposed forward relative to the fuel tank T. The canister C is connected not only to the fuel tank T through a charge path S1 but also to an intake system of an engine E, which is mounted in an engine room in a forward portion of the vehicle, through a purge path S2.

A drain pipe 1 is connected to the canister C through a filter (not shown). When the engine E is not in operation, air sent to the canister C with evaporated fuel through the charge path S1 is discharged into the atmosphere via the drain pipe 1 after it undergoes treatment conducted by activated carbon in the canister C. In contrast, when the engine E is in operation, air is drawn from the atmosphere via the drain pipe 1 assisted by negative pressure produced by an intake system of the engine E. Subsequently, the evaporated fuel in the canister C is desorbed by the air and supplied to the engine E via the purge path S2.

An end portion of the drain pipe 1 is disposed under the vehicle and normally under its floor. Symbol F in FIG. 1 represents a frame member, which is a part of a body frame located in a rear portion of the vehicle. The frame member F is a member which runs along a side of the fuel tank T in a forward-backward direction of the vehicle. The frame member F is a box-like member having a cross section of hollow rectangle. In the present embodiment, a through hole Fa is drilled in an upper plate of the frame member F, and the end portion of the drain pipe 1 is inserted into the through hole Fa in a downward direction so that the end portion is located in an inner space of the frame member F. The frame member F is not completely made airtight but has venting holes, which allow communication in terms of air and water between the inside and outside of the frame member F.

The drain pipe 1 according to the present embodiment includes a drain pipe member 1A and a drain pipe member 1B. The drain pipe member 1A, which is made of a long rubber tube, for example, and which has a bent portion for routing, is connected to the canister C. On the other hand, the drain pipe member 1B, which is adapted to be connected to the frame member F, serves as an end portion of the drain pipe 1. As shown in FIG. 2, the drain pipe member 1B is inserted into the drain pipe member 1A and they are mechanically secured to each other by fasteners (not shown). Description is given of the drain pipe member 1B which plays an important role of the present invention.

The drain pipe member 1B is a plastic molded product. As shown in FIGS. 2 and 3, the drain pipe member 1B has a connecting pipe member 2, which is extended diagonally upward and connected to the drain pipe member 1A. Also, the drain pipe member 1B has a terminal pipe 3, which has an opening 4 serving as an intake for air, and which is vertically extended upward from the opening 4. In this connection, as shown in FIG. 2A, the vicinity of the opening 4 of the terminal pipe member 3 is shown in a broken-out section.

A plurality of claws 5, which are engaged with an edge of a through hole Fa of the frame member F, is integrally formed around the outer circumferential surface of the terminal pipe member 3. The claws 5 start from a middle position of the terminal pipe member 3 in its vertical direction and extend diagonally upward. When the terminal pipe 3 and the through hole Fa are aligned, an outermost end of each claw 5 is located radially outside an edge of the through hole Fa. A ring-like plate 6, whose diameter is greater than that of the through hole Fa, is integrally formed with the outer circumferential surface of the terminal pipe 3 above the claws 5.

Figure 2A:
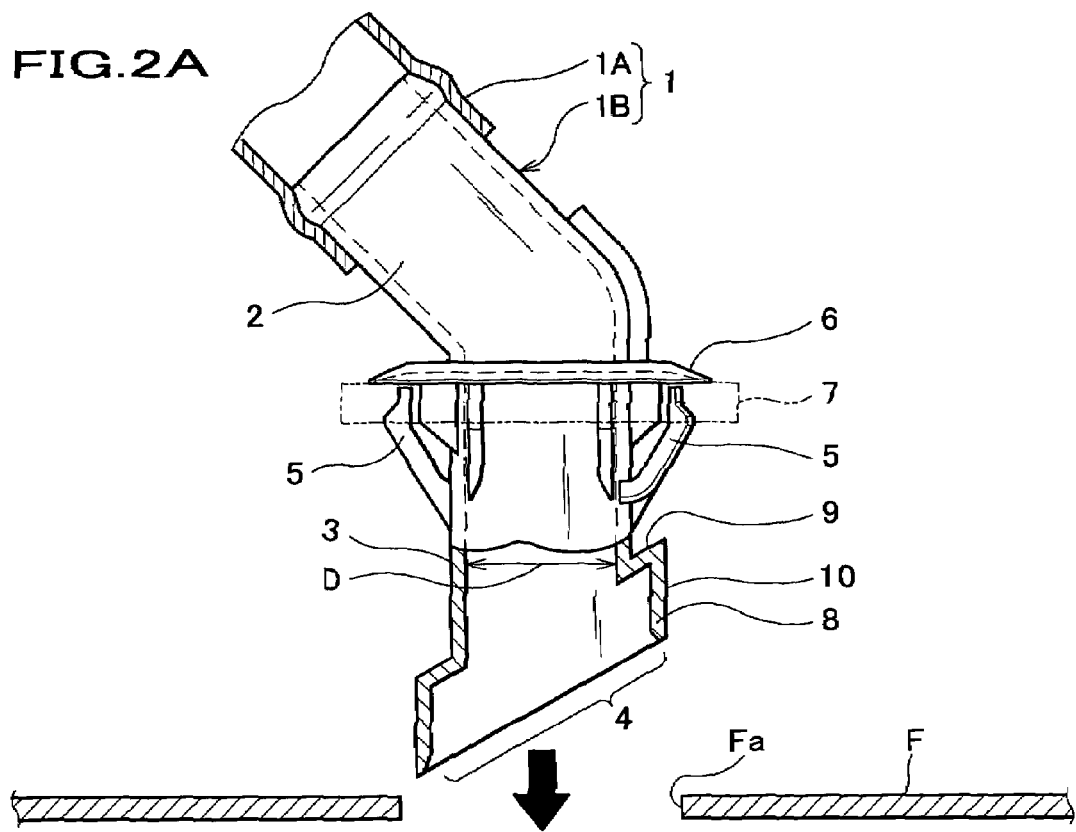
FIG. 2A is a sectional view showing an area A in FIG. 1 before a drain pipe is attached to a frame member.
Figure 2B:
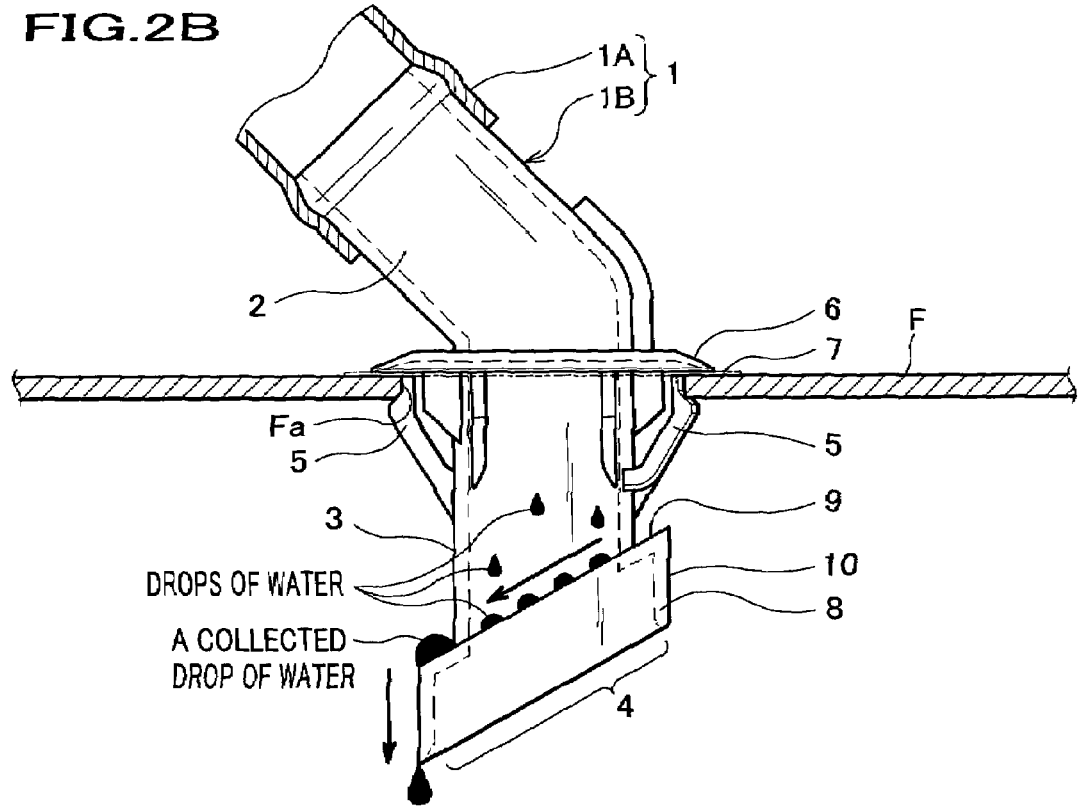
FIG. 2B is a sectional view showing an area A in FIG. 1 after a drain pipe is attached to a frame member.
Figure 3:
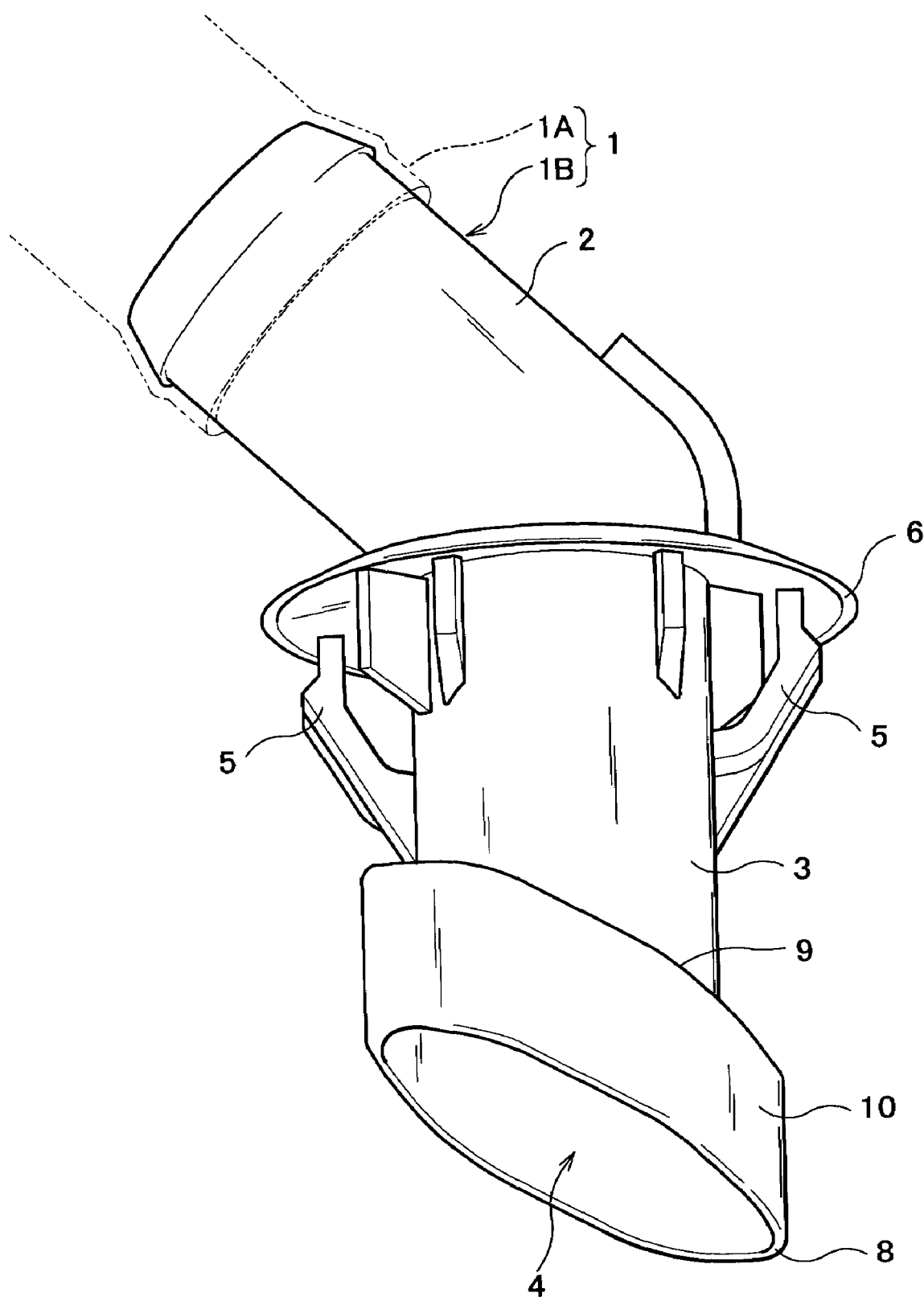
FIG. 3 is a perspective view showing an end portion of a drain pipe.

As shown in FIG. 2A, when the terminal pipe 3 is inserted into the through hole Fa downward, the claws 5 are pressed by the edge of the through hole Fa in the middle of insertion, making inward elastic deformation. As shown in FIG. 2B, the ring-like plate 6 then rests on the upper surface of the frame member F near the through hole Fa, and upper ends of the claws 5 engage with the edge of the through hole Fa with spring effect. In this way, the drain pipe member 1B is aligned with and attached to the frame member F. In this connection, a packing member 7 like foamed rubber (shown by a phantom line) is interposed between a lower surface of the ring-like plate 6 and the frame member F. As described above, it becomes easier to attach the drain pipe member 1B downward to a plate member, such as the frame member F.

According to the present invention, the area of the opening 4 is adapted to be greater than a cross section area of the terminal pipe 3, which is representative of a cross section area with an inner diameter D and a flow passage cross section area. Because velocity of air drawn in at the opening 4 can be controlled to be lower than that in the drain pipe 1, it is possible to prevent sucking drops of water which drip from a periphery 8 of the opening 4.

Figure 4A:
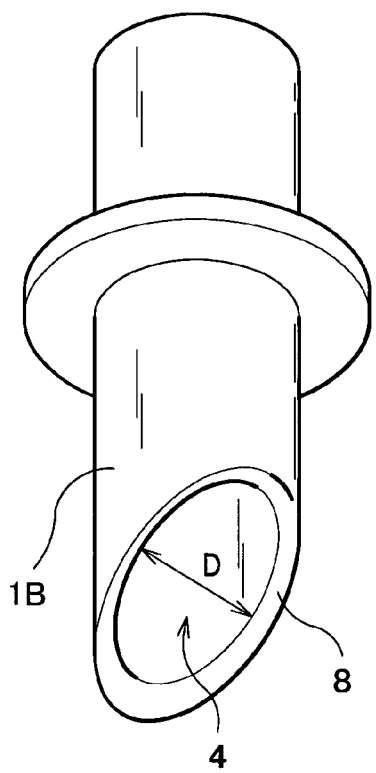
FIGS. 4A-4C are perspective view showing examples of modification for an end portion of a drain pipe.

It is an example of increasing the area of the opening 4 that the periphery 8 of the end of the terminal pipe 3 is cut diagonally relative to an axial direction of the drain pipe member 1B, as shown in FIG. 4A. Because the opening 4 has an elliptical shape with a minor axis of the inner diameter D, it is possible to retain a greater opening area compared with the flow passage cross section area of the drain pipe member 1B.

Figure 4B:
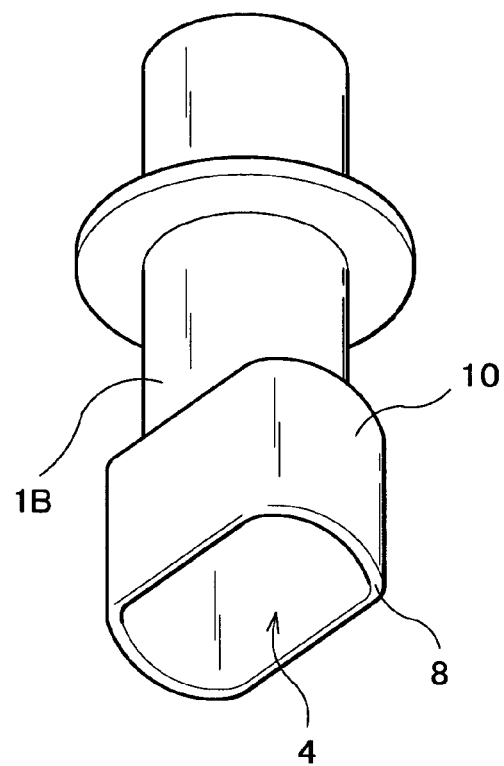

Another example to increase the opening area is shown in FIG. 4B. In this example, the drain pipe member 1B has an enlarged section 10 whose cross section area is greater than that of other portions of the drain pipe member 1B. The enlarged section 10 is integrally formed with the end of the drain pipe member 1B. A cross section of the enlarged section 10 is not limited to a particular shape but an ellipse as well as a circle may be selected. As shown in FIG. 4B, an approximately elliptical shape with straight sections may also be adopted.

It is known from a comparison between first and second modifications shown in FIGS. 4A and 4B that the first modification has advantages. Because the first modification does not have an enlarged section 10 compared with the second modification, it is possible to downwardly insert it into a smaller through hole Fa. Furthermore, because the first modification without the enlarged section 10 is more compact than the second modification, the former is able to prevent interference with other devices and members when they exist around it.

The drain pipe member 1B as shown in FIGS. 2 and 3, which is an example of combination of the first and second modifications, includes an enlarged section 10, a periphery 8 of which is adapted to be diagonal relative to an axial direction of the drain pipe member 1B (the terminal pipe 3). In this way, it is possible to retain a greater area of the opening 4. The enlarged section 10 is adapted to be a right size so that it may be inserted into the through hole Fa of the frame member F. This drain pipe member 1B has a step which is formed where its outer circumferential surface and the enlarged section 10 meet. The step is adapted to be diagonal relative to the axial direction of the drain pipe member 1B (the terminal pipe 3). In this way, the step is able to serve as a flange 9 which guides and collects drops of water attached to the circumferential surface of the drain pipe member 1B (the terminal pipe 3).

As shown in FIG. 2B, the drops of water, which fall along the circumferential surface of the terminal pipe 3, travel on a slope of the flange 9 to its lowest end. The drops of water which are collected at the lowest end of the flange 9 make a larger drop, so that the larger drop vertically falls along the circumferential surface of the enlarged section 10 and then drips from the lowest end of the periphery 8. Because the drops of water only drip from the lowest end of the periphery 8 in a larger collected drop, it is possible to better avoid sucking of drops of water in collaboration with the effect of a reduction in the air velocity as a result of extension of the area of the opening 4.

Figure 4C:
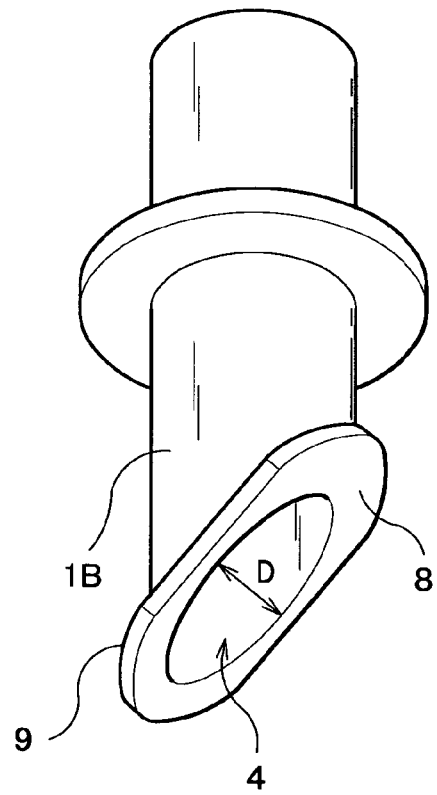

An end structure shown in FIG. 4C is an example of modification, a third modification, which is made of the end structure shown in FIG. 4A and a flange 9 attached to it without an enlarged section 10. This example is also able to achieve the same advantages as those described above.

While the invention has been described in detail and with reference to specific embodiments thereof, it will be apparent to one skilled in the art that various changes and modifications can be made therein without departing from the spirit and scope thereof.

What is claimed is:

1. An air intake pipe system comprising:
   a pipe member having
      an outer surface,
      a first end having a first axial direction,
      a second end having a second axial direction transverse to the first axial direction and having an angled terminal end having a periphery offset at a diagonal relative to the second axial direction,
      an inner bore extending from the first end to the angled terminal end of the second end and having a uniform cross sectional area from the first end to the angled terminal end of the second end,
      a plate formed to and extending circumferentially outward from the outer surface of the second end of the pipe member;

a plurality of claws disposed circumferentially about the outer surface of the second end of the pipe member and extending outwardly from the outer surface of the pipe member;

a flange formed to and extending circumferentially outward from the outer surface of the pipe member at the angled terminal end of the pipe member, said flange offset at a diagonal relative to the second axial direction; and a collar having a cross sectional area larger than the uniform cross sectional area of the inner bore and axially extending from a periphery of the flange so as to prevent water from entering the inner bore of the pipe member, a periphery of the collar and the periphery of the angled terminal end having the same offset relative to the second axial direction of the second end of the pipe member, the flange and the collar having an outer diameter configured to pass through a through hole formed in and extending through a frame member to which the pipe member is installed.

2. The pipe system in claim 1, wherein the first end of the pipe member is part of an upper end portion that is bent relative to the second end of the pipe member.

3. The pipe system of claim 1, wherein the plurality of claws extends outwardly in a first direction and a second direction, wherein the second direction is substantially parallel to the second axial direction of the second end of the pipe member, and wherein the first direction is transverse to the second axial direction of the second end.

4. The pipe system of claim 1, wherein the collar has an elliptical shape, a circular shape, or a rectangular shape.

5. The pipe system in claim 1, wherein the first end of the pipe member further includes an attaching means for coupling the pipe member to another pipe member.

6. The pipe system in claim 1, wherein the claws are disposed between the flange and the plate.

7. The pipe system in claim 1, wherein the first end includes a barb.

8. The pipe system in claim 1, wherein the pipe member further comprises a plurality of rib elements spaced apart in a radial direction about the outer surface of the pipe member.

9. The pipe system in claim 1,
wherein the pipe member further comprises a plurality of rib elements spaced apart in a radial direction about the outer surface of the pipe member, and
wherein the first end of the pipe member includes a barb.

* * * * *